United States Patent [19]

Tamura

[11] Patent Number: 5,162,717

[45] Date of Patent: Nov. 10, 1992

[54] LOOM OPERATING APPARATUS AND METHOD

[75] Inventor: Zenji Tamura, Kanazawa, Japan

[73] Assignee: Tsudakoma Kogyo Kabushiki Kaisha, Kanazawa, Japan

[21] Appl. No.: 649,064

[22] Filed: Feb. 1, 1991

[30] Foreign Application Priority Data

Feb. 9, 1990 [JP] Japan ................................. 2-31122

[51] Int. Cl.$^5$ ........................................... H02P 1/26
[52] U.S. Cl. ...................................... 318/778; 318/431; 318/807; 318/812
[58] Field of Search ............... 318/430, 431, 722, 723, 318/732, 778, 779, 780, 807, 812; 139/1 E, 309, 310, 311, 327

[56] References Cited

U.S. PATENT DOCUMENTS

| | | | |
|---|---|---|---|
| 4,317,074 | 2/1982 | Erth | 318/808 |
| 4,442,394 | 4/1984 | Beierholm et al. | 318/807 |
| 4,719,398 | 1/1988 | Paice | 318/778 |
| 4,859,924 | 8/1989 | Chonan | 318/808 |

FOREIGN PATENT DOCUMENTS 60-50899 11/1985 Japan .

*Primary Examiner*—Bentsu Ro
*Attorney, Agent, or Firm*—Oblon, Spivak, McClelland, Maier & Neustadt

[57] ABSTRACT

A loom operating apparatus and method involving the use of an inverter device interposed between loom motor and power supply. The inverter device is controlled so as to make the motor torque greater than a rated value from immediately after start-up up to the completion thereof, and equal to the rated value thereafter. This eliminates contact wear and other disadvantages associated with the use of contact circuits, and allows the loom to be started up free of staggered weaves.

2 Claims, 3 Drawing Sheets

LOOM OPERATING APPARATUS AND METHOD

BACKGROUND OF THE INVENTION

The present invention relates to a loom operating apparatus and method whereby a loom is started up without having a contact circuit switch the winding connection of the loom motor so as to prevent a staggered weave in the start-up stage.

One known method for starting a loom, as disclosed in Japanese Patent Laid Open No. 60-50899, involves bringing the loom motor windings into a delta connection upon start-up and switching the windings to a star connection at the completion of the start-up stage. This prior art method is called the stagger-free starting method.

More specifically, a low level of loom motor torque upon start-up would produce a weak beating force immediately after the start-up, resulting in a staggered weave. According to the above prior art method, a rated voltage times the square root of three (3) is applied upon start-up to the motor windings to make the torque higher than rated. At the completion of the start-up stage, the torque is reduced to the rated value, thereby effectively preventing the staggered weave from occurring. To switch the motor windings from delta connection to star connection requires installing a star connection contactor and a delta connection contactor. The star connection contactor short-circuits one-side ends of three independent windings, and the delta connection contactor brings the motor windings into a ring-like connection. The delta connection contactor is activated immediately after start-up. At the completion of the start-up stage, the delta connection contactor is deactivated and the star connection contactor is activated.

Under the above prior art method, as described, the main circuit must comprise the star and delta connection contactors for motor winding switchover. This necessarily entails a number of disadvantages associated with contact circuits such as contact wear and spark generation. Furthermore, the circuit switchover involves a time period in which the loom motor is not powered, which may provide another source for causing a staggered weave.

SUMMARY OF THE INVENTION

OBJECT OF THE INVENTION

It is therefore a primary object of the present invention to provide a loom operating apparatus and method whereby the loom is started up free of staggered weaves without the use of contact circuits within the main circuit thereof (hence no contact wear or spark generation) and without the presence of a time period in which the loom motor is not powered.

DISCLOSURE OF THE INVENTION

In achieving the foregoing and other objects of the present invention and according to one aspect thereof, there is provided a loom operating apparatus comprising an inverter device interposed between a power supply and the loom motor, the inverter device having a means for changing the operating parameter thereof so that the torque generated by the loom motor becomes greater than rated in the absence of a start-up completion signal and returns to the rated value when the start-up completion signal is supplied. The changing means preferably contains a smoothing means for changing the operating parameter in a shock-free manner.

According to another aspect of the invention, there is provided a loom operating method whereby the operating parameter of the inverter device is changed so that upon start-up of the loom motor, the torque of the loom motor becomes greater than rated from immediately after the start-up stage begins up to the completion thereof and returns to the rated value thereafter.

The operating parameter is preferably changed in a shock-free manner.

DETAILED DESCRIPTION OF THE PREFERRED EMBODIMENTS

Preferred embodiments of the invention will now be described in detail with reference to the accompanying drawings.

Figure 1:
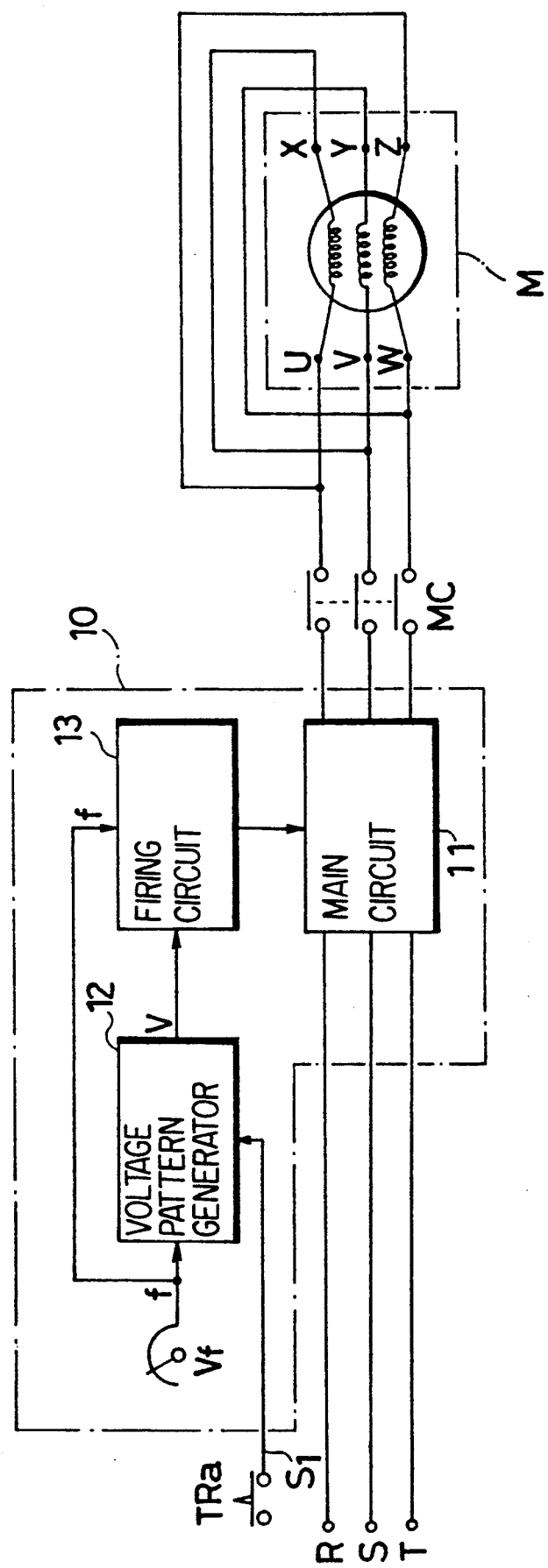
FIG. 1 is an overall schematic flow diagram of one preferred embodiment of the present invention.

In one preferred embodiment, as shown in FIG. 1, a loom operating apparatus according to the invention comprises an inverter device 10 interposed between a three-phase AC power supply RST and a loom motor M.

The loom motor M has three windings designated by reference characters UX, VY and WZ. These windings are illustratively formed in delta connection and are connected to the output of the inverter device 10 via a main contactor MC.

The inverter device 10 comprises a frequency setter Vf, a voltage pattern generator 12 and a firing circuit 13 for controlling a main circuit 11 containing switching elements such as thyristors. The output of the frequency setter Vf is input to both the voltage pattern generator 12 and for controlling 13. The output of the voltage pattern generator 12 is fed via the firing circuit 13 to the main circuit 11. The voltage pattern generator 12 is connected to a timer contact TRa that provides a start-up completion signal S1 from the outside.

Figure 2:
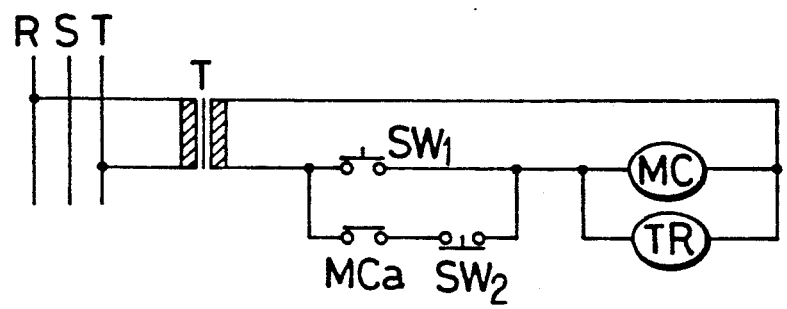
FIG. 2 is a circuit diagram of a typical auxiliary control circuit for use with the embodiment.

The timer contact TRa may be a usually opened contact of a timer TR connected in parallel with the main contactor MC, as depicted in FIG. 2. That is, control power is supplied from the power supply RST via an auxiliary transformer T. The main contactor MC is connected to the secondary side of the auxiliary transformer T, in series with a starting switch SW1. A series circuit constituted by an auxiliary contact MCa of the main contactor MC and a stopping switch SW2 is connected in parallel with the starting switch SW1. The timer TR is connected in parallel with the main contactor MC.

The above-described loom operating apparatus works as follows: The voltage pattern generator 12 in the inverter device 10 establishes a voltage-to-frequency ratio (V/f) of the output of the inverter device 10 in accordance with the presence or absence of the start-up completion signal S1, the signal status being determined by the closing or opening of the timer contact TRa. The firing circuit 13 is supplied with a voltage set value V corresponding to a frequency set value "f" on the frequency setter Vf in effect at that point in time. The firing circuit 13 admits both the voltage set value V and the frequency set value "f" from the frequency setter Vf, and accordingly controls the main circuit 11 so that the inverter device 10 provides an output having the voltage V and the frequency "f."

It is hereafter assumed that $V_0$ stands for the rated voltage of the loom motor M and $f_0$ for the rated frequency and that the frequency set value "f" of the frequency setter Vf is equal to the rated frequency ($f=f_0$). When the voltage pattern generator 12 outputs a voltage V higher than the rated voltage ($V>V_0$) in the absence of the start-up completion signal S1, and outputs a voltage V equal to the rated voltage ($V=V_0$) if the start-up completion signal S1 is supplied, the loom motor M is controlled so that the motor torque is made greater than the rated value or equal thereto depending on the presence or absence of the start-up completion signal S1.

The start-up completion signal S1 is generated by operation of the timer TR. The timer TR is activated upon elapse of a predetermined period of time after the starting switch SW1 is closed to activate the main contactor MC (see FIG. 2). In this setup, the inverter device 10 changes the voltage-to-frequency ratio so that where the delay time of the timer TR is set longer than the start-up time of the loom motor M, the motor torque becomes greater than rated from immediately after the start-up of the loom motor M up to the completion thereof, and returns to the rated value thereafter.

OTHER EMBODIMENTS

Figure 3:
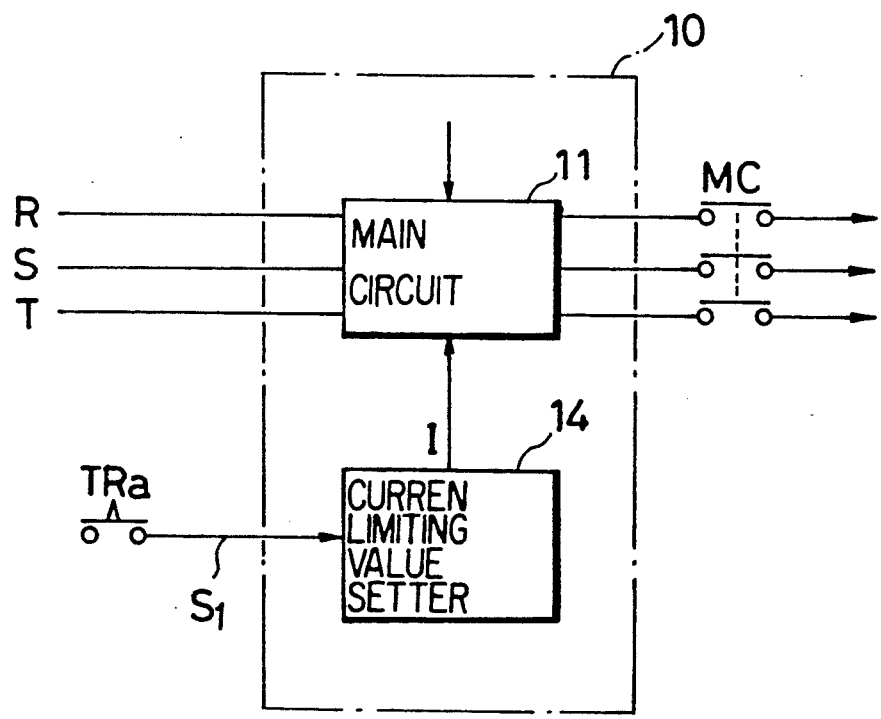
FIGS. 3 through 5 are partial schematic flow diagrams of other embodiments of the invention.

As illustrated in FIG. 3, the inverter device 10 may comprise a current limiting value setter 14 to which the start-up completion signal S1 is input. The current limiting value setter 14 supplies the main circuit 11 with a different current limiting value I in accordance with the presence or absence of the start-up completion signal S1. So the main circuit 11 controls the maximum current of the loom motor M according to the current limiting value I. This allows the torque generated by the loom motor M to be changed as desired.

Figure 4:
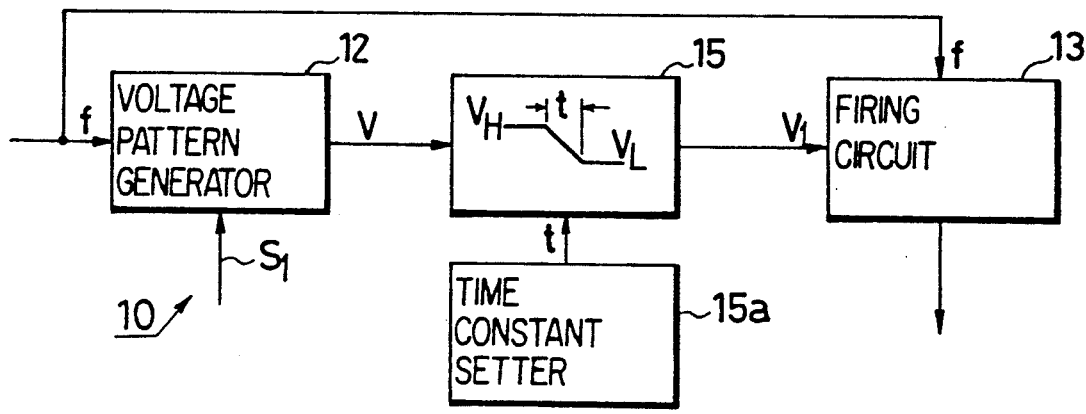
Figure 5:
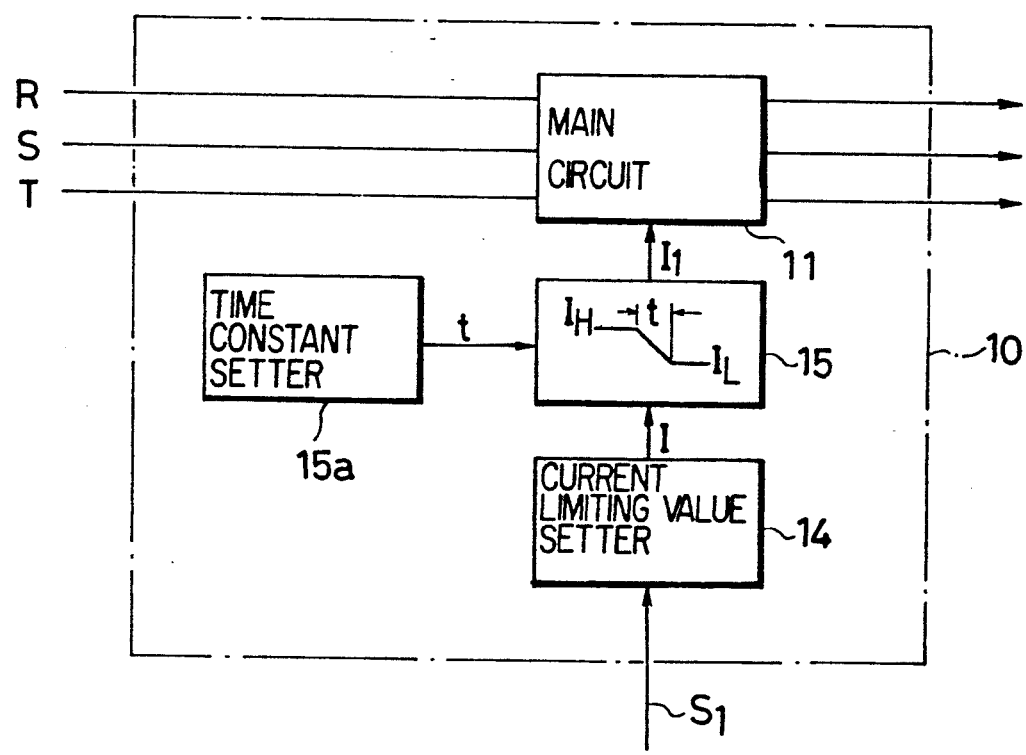

In the above-described embodiments, the voltage pattern generator 12 or the current limiting value setter 14 constitutes the changing means for changing the voltage-to-frequency ratio (V/f) or current limiting value I, which is the operating parameter of the inverter device 10, upon input of the start-up completion signal S1. As depicted in FIGS. 4 and 5, the changing means may contain a ramp signal generator 15 interposed between the voltage pattern generator 12 and the firing circuit 13, or between the current limiting value setter 14 and the main circuit 11.

The ramp signal generator 15 uses a time "t" set on a time constant setter 15a attached thereto. When the voltage set value V or current limiting value I as the input to the ramp signal generator 15 is changed, the value is linearly reduced from its maximum VH or IH to its minimum VL or IL over the time "t." The minimum value is sent as a voltage value V1 or a current limiting value I1 to the firing circuit 13 or main circuit 11. Thus the operating parameter of the inverter device 10 is changed in a shock-free manner depending on the presence or absence of the start-up completion signal S1. The ramp signal generator 15 and the time constant setter 15a constitute a smoothing means for smoothly changing in a linear manner the voltage V or current limiting value I from its maximum VH or IH to its minimum VL or IL over the predetermined time "t." Alternatively, the smoothing means may be one for changing the operating parameter along any suitable curve instead of a straight line.

As described and according to the invention, the operating parameter of the inverter device that powers the loom motor is changed so that the torque of the loom motor is made greater than and equal to the rated level before and after the completion of the motor start-up stage respectively. One advantage of this setup is that it eliminates the need to use contact circuits in the main circuit. Another advantage is that there is no room for a time period in which the loom motor is not powered upon operating parameter switchover. Where all disadvantages associated with the use of contact circuits are removed, the loom is started up free of staggered weaves.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A loom operating apparatus comprising an inverter device interposingly installed between a power supply and a loom motor, said inverter device having a means for changing an operating parameter thereof so that the torque of said loom motor becomes greater than a rated value in the absence of a start-up completion signal and returns to said rated value when said start-up completion signal is supplied, wherein said inverter device comprises a voltage pattern generator and a firing circuit for controlling a main circuit, said voltage pattern generator being connected to a frequency setter, said firing circuit being connected to said main circuit, and further comprising a ramp signal generator interposed between said voltage pattern generator and said firing circuit.

2. A loom operating apparatus comprising an inverter device interposingly installed between a power supply and a loom motor, said inverter device having a means for changing an operating parameter thereof so that the torque of said loom motor becomes greater than a rated value in the absence of a start-up completion signal and returns to said rated value when said start-up completion signal is supplied, wherein said inverter device comprises a current limiting value setter connected to a main circuit and further comprises a ramp signal generator interposed between said current limiting value setter and said main circuit.

* * * * *